Patented Feb. 1, 1927.

1,615,846

UNITED STATES PATENT OFFICE.

WILLIAM F. R. MURRIE, OF HERSHEY, PENNSYLVANIA.

PROCESS OF MANUFACTURING WHITE SUGAR.

No Drawing. Application filed December 1, 1924. Serial No. 753,026.

This invention relates, generally, to improvements in the process of manufacturing white sugar direct from raw cane juices, or from sugar syrups.

The invention has for its principal objects to provide a simple and direct process or method of manufacturing white sugar direct from raw cane juices, without necessity of first boiling and reducing the juices to raw sugar; to provide a novel process whereby the undesired formation of caramel and iron color compounds and invert sugar is reduced to a minimum, and, consequently, whereby a maximum quantity of high grade crystallizable sugar is obtained; and, finally, to provide a novel process which entails a considerable saving of time, labor and apparatus, and which, by reason of its simplicity and directness, is available for use in local plantation factories or mills.

I have discovered that if care is taken to obtain a thorough defecation of raw cane juices to thereby produce a clear or brilliant liquor, such thoroughly defecated raw juice may be filtered over bone black, animal carbon or any carbonaceous material with a mineral structure whereby both organic and inorganic soluble impurities are removed therefrom, with the result that the purified juice is thereupon in a most satisfactory condition for boiling in vacuum pans to produce the granulated white sugar desired. My invention, therefore, consists, mainly, in the combination with a series of process steps whereby a thorough defecation of the juice is attained, of a final clarification step consisting in running the thoroughly defecated juice through bone black filters prior to final boiling thereof in vacuum pans.

In detail my novel process is carried out as follows:—

The raw cane juice from the crushing mills is first passed over screens of suitable mesh to mechanically separate therefrom the particles of cane fiber, bagacillio, etc., whereupon the juice is then pumped through a juice heater to raise its temperature to 160 degrees F. or more. This preliminary heating of the juice coagulates the major portion of the albumins and colloidal silica for subsequent removal in the settling tank. The next step is to lime the juice, that is, to add a sufficient quantity of lime thereto to precipitate or separate much of the organic impurities contained in the juice. The limed juice, with its precipitated organic impurities, is run into a suitable settling tank, e. g. such as a Dorr clarifier. In the settling tank, the precipitates settle out of the juice, so that the partially clear juice may be drawn off, while the "mud" is run off into a mud tank, after which it may be pressed to express any remaining juice contained therein, such recovered juice being preferably sent back to the liming tank, while the resultant mud cake may be utilized as a fertilizer. The juice decanted from the settling tank or Dorr clarifier is conveyed to tanks fitted with heating coils and agitating means, commonly referred to as blow-up tanks. When the juice is delivered to said blow-up tanks, there is added thereto a suitable precipitant, such as a phosphate, and which is adapted to precipitate the lime and iron compounds present in the juice. The phosphate or like precipitant being thoroughly distributed throughout the juice by the agitation which the latter undergoes in the blow-up tanks, the phosphate or like precipitant treated juice is thereupon delivered into a second settling tank, e. g. such as a Dorr clarifier. While in this second settling tank, the lime and iron compounds in the phosphate or like precipitant treated juice are precipitated and settled out of the juice, the "mud" being treated as heretofore mentioned, and the thus further cleared juice being decanted for further treatment. The juice decanted from the second settling tank or Dorr clarifier is conveyed to suitable evaporators where it is concentrated down to approximately 50 per cent solid matter in solution. The concentrated juice is now run into tanks, heated if desired, and paper pulp or similar mechanical filtering material is added thereto preparatory to passing the concentrated juice through a suitable filter press. I have found that a Vallez rotary press (described in United States Letters Patent No. 1,227,982, and No. 1,227,983, both dated May 29, 1917), serves admirably as the filter press medium, through which the juice is finally passed to produce the final thoroughly defecated or clear brilliant condition desired and necessary before submitting the juice to the bone black filtration step of my novel process.

The above steps which are preliminary to the bone black filtration step, are adapted to thoroughly defecate the raw juice and therefore produce a clear brilliant liquor. At this point, however, the virgin raw juice still contains a certain amount of both soluble organic and some inorganic matter in the nature of coloring compounds and molasses forming impurities. It is highly desirable to remove as far as possible such impurities, to prevent thereby the formation of caramel compounds and invert sugar. I have found that by filtering the clear brilliant and thoroughly defecated juice over a carbonaceous material, such as bone black, animal char, etc., substantially all the soluble organic and the inorganic matter making up the coloring compounds and molasses forming impurities are removed, leaving a comparatively pure substantially colorless juice containing a maximum quantity of crystallizable sugar, which may be at once boiled in vacuum pans to crystallize the same into a high grade white sugar.

In describing the process of attaining thorough defecation of the virgin raw juice, I have stated that the juice may be concentrated before passing the same through filter presses. I wish to point out, however, that the juice may be passed through the filter presses without being concentrated; in other words it may be filter pressed and then filtered over the bone black at its normal density or a higher density. I believe it preferable, however, for best results, that the density of the juice be approximately around 28 Baumé.

The advantages of my direct process, as above set forth in detail, over the ordinary method of first reducing the raw juice, by boiling, to raw sugar, and then refining the raw sugar, are that, during the process of boiling the raw juice for raw sugar, a large amount of caramel forming and iron color compounds are created which are exceedingly difficult to remove by char or similar filtration methods; and, if the coloring compounds are not removed, then a greater amount of boiling of sugar is necessary so that the coloring compounds may be washed from the sugar; whereas under my novel process, the boiling of the virgin raw juice, with the consequent evil effects, is eliminated, and an efficiently purified raw juice is obtained, which is free from caramel forming compounds, color and destroying sugar, and which contains a maximum quantity of crystallizable sugar.

Having thus described my invention, I claim:—

1. The process of refining virgin or raw sugar juices, which comprises liming such juices to precipitate organic impurities, separating said precipitated organic impurities to partially clear the juices, then filter pressing the partially cleared juices with a suitable filter aid, and finally filterng the resultant clear juices over bone black to remove soluble impurities.

2. The process of refining virgin or raw sugar juices, which comprises liming such juices to precipitate organic impurities, settling the precipitated impurities and decanting the partially cleared juices, adding a suitable precipitant to the decanted juice to precipitate the lime and iron compounds, again settling the precipitates and decanting the further cleared juices, then filtering the resultant juices through a suitable filter press, finally clarifying the juices by filtering over bone black to remove soluble organic and inorganic matter, and then crystallizing the clarified juices in vacuum pans.

3. The process of refining virgin or raw sugar juices which comprises straining the juices, then heating the same to partially remove albumins and colloidal silica, then liming the juices to precipitate organic impurities, settling out the precipitate, then treating the juices with a phosphate precipitant to precipitate the lime and iron compounds, again settling out the precipitate, then adding a paper pulp to the juices and filtering the same through a suitable filter press, finally clarifying the juices by filtering over bone black to remove soluble organic and inorganic matter, and then crystallizing the clarified juices in vacuum pans.

4. The process of refining virgin or raw sugar juices, which consists in straining the juices, then heating the same to partially remove albumins and colloidal silica, then liming the juices to precipitate organic impurities, settling out the precipitate, then treating the juices with a phosphate precipitant to precipitate the lime and iron compounds, again settling out the precipitate, then concentrating the juices, then adding paper pulp to the juices and filtering the same through a suitable filter press, finally clarifying the juices by filtering over bone black to remove soluble organic and inorganic matter, and then crystallizing the clarified juices in vacuum pans.

5. The process of refining virgin or raw sugar juices, which comprises liming such juices to precipitate organic impurities, settling the precipitated impurities and decanting the clear juices, adding a suitable precipitant to the decanted juices to precipitate the lime and iron compounds, again settling the precipitates and decanting the clear juices, then concentrating the juices, then filtering the same through a suitable filter press and finally clarifying the juices by filtering over a carbonaceous material to remove soluble organic and inorganic matter prior to crystallizing the juices in vacuum pans.

In testimony, that I claim the invention set forth above I have hereunto set my hand this 4th day of November, 1924.

WILLIAM F. R. MURRIE.